United States Patent
Aoyama et al.

(10) Patent No.: US 9,550,441 B2
(45) Date of Patent: Jan. 24, 2017

(54) CLIP FOR MOUNTING COMPONENT, AND COMPONENT-MOUNTING STRUCTURE

(75) Inventors: Makoto Aoyama, Matsumoto (JP);
Koichi Maruyama, Matsumoto (JP);
Yasuo Horiuchi, Matsumoto (JP);
Naoyasu Asano, Matsumoto (JP);
Yoshihiko Takeda, Chiyoda-ku (JP);
Hiroshi Kawai, Chiyoda-ku (JP)

(73) Assignees: TOPY FASTENERS, LTD., Matsumoto-shi, Nagano (JP); KUMI KASEI CO., LTD., Chiyoda-ku, Tokyo (JP)

( * ) Notice: Subject to any disclaimer, the term of this patent is extended or adjusted under 35 U.S.C. 154(b) by 57 days.

(21) Appl. No.: 14/415,228

(22) PCT Filed: Jul. 24, 2012

(86) PCT No.: PCT/JP2012/004721
§ 371 (c)(1),
(2), (4) Date: Jan. 16, 2015

(87) PCT Pub. No.: WO2014/016869
PCT Pub. Date: Jan. 30, 2014

(65) Prior Publication Data
US 2015/0183356 A1    Jul. 2, 2015

(51) Int. Cl.
*B60N 3/02* (2006.01)
*B60R 13/02* (2006.01)
*F16B 21/07* (2006.01)

(52) U.S. Cl.
CPC .............. *B60N 3/026* (2013.01); *B60N 3/023* (2013.01); *B60R 13/0206* (2013.01); *F16B 21/075* (2013.01)

(58) Field of Classification Search
CPC ............ B60N 3/02; B60N 3/023; B60N 3/026; B60R 13/0206; F16B 21/075
(Continued)

(56) References Cited

U.S. PATENT DOCUMENTS 6,606,766 B2 * 8/2003 Ko ........................ B60J 3/0217
24/293
6,629,809 B2 * 10/2003 Vassiliou .............. F16B 37/041
411/173

(Continued)

FOREIGN PATENT DOCUMENTS

EP          1 880 898 A2      1/2008
FR    WO 2006087049 A1 *   8/2006  ............ F16B 13/025

(Continued)

OTHER PUBLICATIONS

International Search Report (PCT/ISA/210) mailed on Aug. 28, 2012, by the Japanese Patent Office as the International Searching Authority for International Application No. PCT/JP2012/004721.

*Primary Examiner* — Ryan Kwiecinski
(74) *Attorney, Agent, or Firm* — Buchanan Ingersoll & Rooney PC

(57) ABSTRACT

In this clip for mounting a component, a first plate portion includes first engaging pawls, and a second plate portion second engaging pawls, are linked by a linking-side plate portion in the rear end region on a side having either one of the plate portions, and first and second side plate portions which bend and extend from the first and second plate portions are in contact on the side having the other plate portion. The linking-side plate portion and the first and second side plate portions cut through a gap portion formed as an opening in the rear of the first and second plate portions of the clip, and gap portions formed as openings in both sides.

8 Claims, 9 Drawing Sheets

(58) Field of Classification Search
USPC ............ 296/1.02, 1.08; 248/222.12, 220.31;
24/289, 293, 295, 297, 458
See application file for complete search history.

(56) References Cited

U.S. PATENT DOCUMENTS

| | | | | |
|---|---|---|---|---|
| 7,188,392 | B2* | 3/2007 | Giugliano | F16B 5/065 |
| | | | | 24/295 |
| 7,559,592 | B2* | 7/2009 | Yamagiwa | B60N 3/026 |
| | | | | 296/1.02 |
| 7,640,634 | B2* | 1/2010 | Vassiliou | F16B 5/0614 |
| | | | | 24/293 |
| 2004/0083582 | A1* | 5/2004 | Dickinson | F16B 5/0614 |
| | | | | 24/295 |
| 2006/0254032 | A1* | 11/2006 | Gibbons | B60N 3/026 |
| | | | | 24/295 |
| 2010/0026028 | A1* | 2/2010 | Smith | B60R 13/0206 |
| | | | | 296/29 |
| 2014/0093311 | A1* | 4/2014 | Masuda | B60N 3/026 |
| | | | | 403/326 |
| 2015/0232011 | A1* | 8/2015 | Kajio | B60N 3/02 |
| | | | | 296/1.02 |
| 2016/0144801 | A1* | 5/2016 | Huelke | B60N 3/026 |
| | | | | 24/295 |

FOREIGN PATENT DOCUMENTS

| | | |
|---|---|---|
| JP | 2001-206127 A | 7/2001 |
| JP | 2008-296677 A | 12/2008 |
| JP | 2009-121633 A | 6/2009 |
| WO | WO 2012/046287 A1 | 4/2012 |

* cited by examiner

CLIP FOR MOUNTING COMPONENT, AND COMPONENT-MOUNTING STRUCTURE

TECHNICAL FIELD

The present invention relates to a clip for mounting a component used in order to mount an automobile interior component to an automobile interior panel, and a component-mounting structure that uses this clip for mounting a component.

BACKGROUND ART

A mounting structure that uses a plate metal clip is employed to mount an automobile interior component, e.g. a component known as a grab rail or an assist clip (referred to as a grab rail below), to an interior panel. Mounting structures that use a plate metal clip are disclosed in Patent Documents 1 and 2.

The plate metal clip comprises a pair of plate portions linked at the distal ends or proximal ends relative to the direction of insertion, and engaging protuberances cut and raised outward are formed in the plate portions. When a clip of this configuration is passed through a through-hole formed in a base component at both ends of the grab rail to which the clip is being mounted and the clip is pushed into a through-hole in the interior panel, the engaging protuberances of the clip engage in the back surface of the interior panel. Further, a cap is mounted in the through-hole of the base component from the rear side of the clip, so that engaging parts formed in the cap become engaged with the base component from the front side in the direction of insertion, in which state the through-hole of the base component is closed up. In this state, the interior panel is sandwiched between the engaging protuberances of the clip and the area of the base component that faces the interior panel, and held in this state by the cap engaged in the base component.

Thus, when the base component of the grab rail is positioned in the through-hole of the interior panel and the clip and cap are pushed into the through-hole of the base component in this state, the base component is mounted in the interior panel. Therefore, the grab rail can be easily mounted in the interior panel without fastening implements such as screws or bolts.

Mounting structures that use a clip made from a plastic molded article are also known, as disclosed in Patent Document 3. The essential configuration of such a mounting structure that uses a plastic clip is the same as when a plate metal clip is used. Elastically deformable engaging protuberances are formed in the clip, and when the engaging protuberances are passed through through-holes formed in the base component at both ends of the grab rail and pushed into through-holes in the interior panel, the engaging protuberances come to be engaged in the back surface of the interior panel.

PRIOR ART DOCUMENTS

Patent Documents

[Patent Document 1] JP 2009-121633 A
[Patent Document 2] EU 1880898 A
[Patent Document 3] JP 2008-296677 A

SUMMARY OF THE INVENTION

Problems to be Solved by the Invention

In a conventional plate metal clip 100 as shown in FIGS. 9(a) and 9(b), a pair of plate portions 103, 104 having engaging protuberances 101, 102 formed therein are merely linked by a linking plate portion 105 in the distal ends or proximal ends of the direction of insertion (the drawings show a case in which the distal ends are linked). When the clip is fitted and removed, the first and second plate portions 103, 104 are pressed inward and the engaging protuberances 101, 102 are removed from the interior panel-side areas.

To make this possible, the gap A between the first and second plate portions 103, 104 is set to a dimension sufficiently wider than the plate thickness B of both plate portions or the amount by which the engaging protuberances 101, 102 are cut and raised. As a result, the clips 100A, 100B overlap each other from the longitudinal direction or from the side and become entangled at times such as when the clips are packaged as shown in FIG. 9(c), and it becomes difficult to separate and take out the clips one at a time.

When the clips 100A, 100B are forcedly separated as shown in FIGS. 9(d) and 9(e), there is a problem in that the clip 100 readily deforms about the linking plate portion 105 in the clip width direction shown by the arrow 106, or in the clip thickness direction shown by the arrow 107.

The opening in the rear end side of the clip can be closed up in order to prevent such negative effects, but the opening cannot be closed up because a cap must be inserted therein. The clip can also be made into a tubular shape closed up on both sides in the manner of the plastic clip disclosed in Patent Document 3, but it is extremely difficult through plate metal working to manufacture a clip of a three-dimensional shape such that a pair of plate portions are linked not only in the distal end or rear end areas but in side areas as well.

In view of such matters, an object of the present invention is to provide a plate metal clip for mounting a component, whereby instances of clips overlapping each other and becoming entangled and instances of clips easily deforming can be prevented or suppressed.

Another object of the present invention is to provide a component-mounting structure that uses this novel clip for mounting a component.

Means to Solve the Problems

To solve the problem described above, according to the present invention, there is provided a plate metal clip for mounting a component, wherein, when the clip is inserted from a component-side through-hole formed in a component for an automobile interior to which the clip is being mounted into a panel-side through-hole formed in a panel where the component is mounted, the clip engages in the panel and the component comes to be secured in the panel; the clip characterized in comprising:

a first plate portion and a second plate portion extending in the clip longitude direction while facing each other across a fixed gap, the clip longitude direction being the direction in which the clip is inserted;

a linking-side plate portion for linking together rear end portions in one set of first side edges in a clip width direction orthogonal to the clip longitude direction in both the first plate portion and the second plate portion;

a first side plate portion and second side plate portion bending and extending in directions of approaching each other from rear end portions in the clip longitude direction in another set of second side edges in the clip width direction in both the first plate portion and the second plate portion;

a first distal end plate portion and second distal end plate portion bending and extending in directions of approaching each other from distal end edges in the clip longitude direction of the first plate portion and the second plate portion;

a first engaging protuberance formed by cutting and raising part of the first plate portion in a direction away from the second plate portion in a clip thickness direction orthogonal to both the clip insertion direction and the width direction in order to engage in the panel; and a second engaging protuberance formed by cutting and raising part of the second plate portion in a direction away from the first plate portion in the clip thickness direction in order to engage in the panel;

the distal end of the first side plate portion and the distal end of the second side plate portion either being in contact with each other or facing each other across a gap narrower than the clip plate thickness; and the distal end of the first distal end plate portion and the distal end of the second distal end plate portion either being in contact with each other or facing each other across a gap narrower than the clip plate thickness.

In the clip for mounting a component of the present invention, the first plate portion in which the first engaging protuberance is formed and the second plate portion in which the second engaging protuberance is formed are linked by the linking-side plate portion in areas in the rear end on one side and not in the distal end or rear end of the clip insertion direction. In areas in the rear end on the other side in the first and second plate portions there are formed first and second side plate portions that bend and extend from both areas and come in contact with each other (or first and second side plate portions that face each other). The gap between the first and second plate portions of the clip is divided by the linking-side plate portion and the first and second side plate portions into a gap portion opening to the rear and gap portions opening to both sides. As a result, it is possible to prevent or suppress the occurrence of negative effects in which first and second plate portions of another clip enter the gap between the first side plate portions, and the two clips overlap each other and become entangled.

In the distal end of the clip, the first distal end plate portion and the second distal end plate portion extending from the distal ends of the first and second plate portions come in contact with each other, whereby the first and second plate portions are mutually supported. In the rear end of the clip, the first and second plate portions are supported on one side by the linking-side plate portion, and the first and second plate portions are mutually supported on the other side by the first and second plate portions being in contact with each other. This makes it possible to produce a clip that deforms less readily than a clip comprising a pair of cantilevered plate portions linked only at the distal end or the rear end of the clip, as in conventional practice.

To more reliably prevent clips from overlapping each other and becoming entangled, the distal end outer dimension in the clip thickness direction in the distal ends of the first plate portion and the second plate portion in the clip longitude direction is preferably greater than the rear end inner dimension in the clip thickness direction in the rear end edges of the first plate portion and the second plate portion in the clip longitude direction. The distal end outer dimension is also preferably greater than both a first side inner dimension in the clip thickness direction between the first side edges of the first plate portion and the second plate portion, and a second side inner dimension in the clip thickness direction between the second side edges of the first plate portion and the second plate portion.

In the clip of the present invention, in order for the first and second plate portions in which the first engaging protuberance and second engaging protuberance are formed to be easily elastically deformable in the clip thickness direction, a pair of first slits are preferably formed in the first plate portion toward the distal end at a predetermined gap from the rear end edge in the clip longitude direction, and a first cutout piece comprising the first engaging protuberance is preferably formed between these first slits. Similarly, a pair of second slits are formed in the second plate portion toward the distal end at a predetermined gap from the rear end edge in the clip longitude direction, and a second cutout piece comprising the second engaging protuberance is preferably formed between these second slits.

In this case, in order to prevent the negative effect of components such as the first plate portion and second plate portion of another clip getting caught between the first slits or second slits and the clips becoming entangled with each other, rear end edge slit portions in both the first slits and the second slits are preferably made into either inclined slit portions extending in a direction inclined relative to the clip longitude direction, or curved slit portions that extend in a curve.

In addition, the rear end edge slit portions preferably have a slit width narrower than the plate thickness of the first and second plate portions, the linking-side plate portion, the first and second side plate portions, and the first and second distal endplate portions. Specifically, instances of another clip getting caught in the first or second slits can be reliably prevented by making the slit width narrower than the clip plate thickness.

MODE FOR CARRYING OUT THE INVENTION

The following is a description, made with reference to the drawings, of a grab rail mounting structure and a clip for mounting a component (sometimes referred to below simply as a "clip") according to an embodiment of the present invention.

(Grab Rail Mounting Structure)

Figure 1:
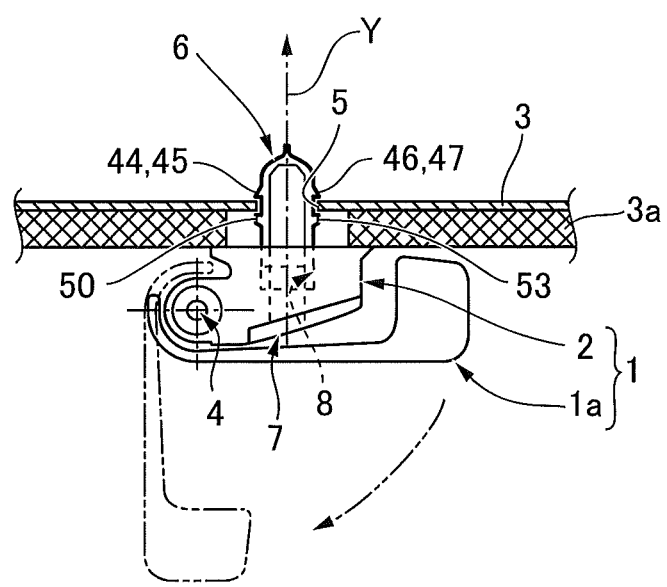
FIG. 1 is an explanatory view of the component-mounting structure, showing the base component of a grab rail, which is an automobile interior component, as being mounted to the interior panel with the use of the clip for mounting a component according to an embodiment of the present invention.
Figure 2:
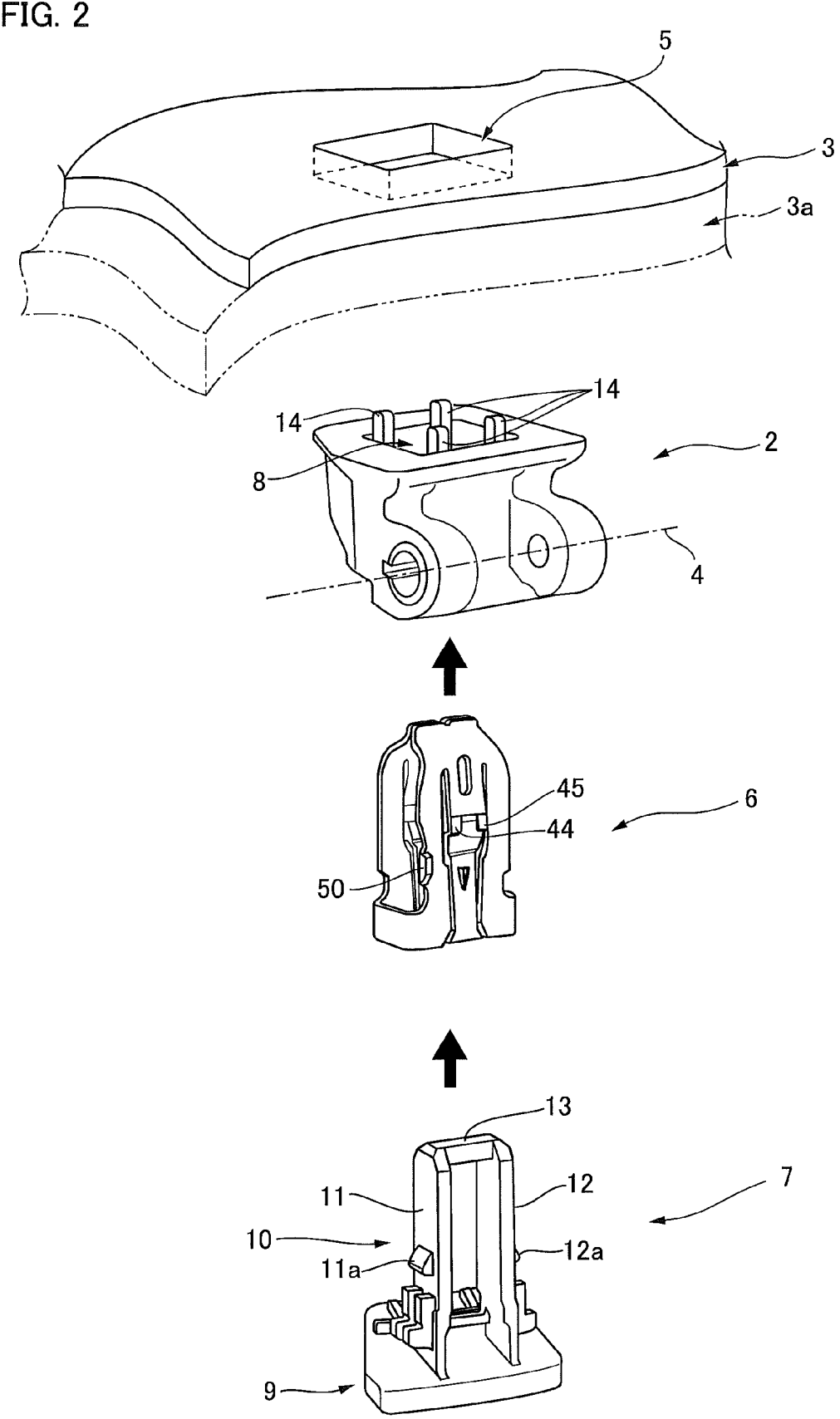
FIG. 2 is an exploded perspective view showing the configurative components of the component-mounting structure of FIG. 1.

First, the grab rail mounting structure according to the embodiment is described with reference to FIGS. 1 and 2. A grab rail 1 comprises a grab rail main body portion 1a and a base component 2 mounted to both ends thereof. An interior sheet 3a is laid over the surface of an interior panel 3 to which the grab rail 1 is mounted. The grab rail main body portion 1a of the grab rail 1 is capable of pivoting about a hinge center line 4 of the base component 2 from a stored position shown by solid lines in FIG. 1 to an opened position shown by imaginary lines, and the grab rail main body portion is usually kept in the stored position shown by the solid lines along the surface of the interior sheet 3a by spring force.

An opening is formed in the interior sheet 3a in the position where the base component 2 is mounted, and a panel-side through-hole 5 formed in the interior panel 3 and used to mount the grab rail is exposed through this opening. The base component 2 made from a plastic molded article is mounted in the area in the interior panel 3 where the panel-side through-hole 5 for mounting the grab rail is formed, by a metal clip 6 and a cap 7 made from a plastic molded article. The clip 6 is inserted into a component-side through-hole 8 formed in the base component 2 from a clip insertion direction Y along the direction of the center axis line. The clip insertion/removal direction Y is herein referred to as the clip longitude direction. The cap 7 is fitted on the clip 6 from the rear side of the clip longitude direction, and the component-side through-hole 8 is closed up by the cap 7. The opening in the interior sheet 3a is closed up by the mounted base component 2.

The distal end portion in the clip 6 is passed through the component-side through-hole 8 of the base component 2 and pressed into the panel-side through-hole 5 of the interior panel 3. Engaging protuberances 44 to 47 (only the engaging protuberances 44, 45 are shown in FIG. 2) are formed in the distal end portion in the clip 6. These engaging protuberances 44 to 47 engage with the back surface of the inner peripheral edge portion of the panel-side through-hole 5, in the clip removal direction. Engaging protuberances 50, 53 (only the engaging protuberance 50 is shown in FIG. 2) are formed in the clip 6 in areas farther rearward than the engaging protuberances 44 to 47. These engaging protuberances 50, 53 engage with the front surface of the inner peripheral edge portion of the panel-side through-hole 5, in the clip insertion direction. Therefore, the interior panel 3 comes to be sandwiched between the engaging protuberances 44 to 47 and the engaging protuberances 50, 53. Consequently, the base component 2 at both ends of the grab rail 1 comes to be mounted by the clip 6 in the area of the interior panel 3 where the panel-side through-hole 5 is formed.

The cap 7 comprises a tabular cap main body portion 9 fitted in the open edge of the component-side through-hole 8 of the base component 2 from the rear in the clip longitude direction to close up the component-side through-hole 8, and a plug portion 10 protruding perpendicular from the cap main body portion 9 and inserted into the clip 6. The plug portion 10 comprises tabular protruding plate portions 11, 12 of fixed width extending in parallel at a fixed gap apart, and a connecting plate portion 13 connecting the distal ends of these protruding plate portions 11, 12 together. The protruding plate portions 11, 12 extend in parallel in the clip insertion direction at a fixed gap apart and engaging parts 11a, 12a, protruding outward in triangular shapes as seen along the clip insertion direction Y, are formed in the outer side surfaces of the plate portions. When the cap 7 is fitted, the protruding plate portions 11, 12 elastically deform inward, and the engaging parts 11a, 12a move over component-side engaging parts (not shown) protruding inward from the inner peripheral side surfaces on both sides of the rectangular cross-sectioned component-side through-hole 8 of the base component 2. In this cap-fitted state, the engaging parts 11a, 12a come to be engaged in the component-side engaging parts of the base component 2 from the sides of the clip removal direction, and the cap 7 will not fall out of the component-side through-hole 8.

Formed in the base component 2 are four contact parts 14 protruding from the four corners of the inner peripheral edge portion of the component-side through-hole 8. A gap between the base component 2 and the interior panel 3 is maintained by the contact parts 14, and the interior sheet 3a comes to be held between the base component 2 and the interior panel 3.

Figure 3:
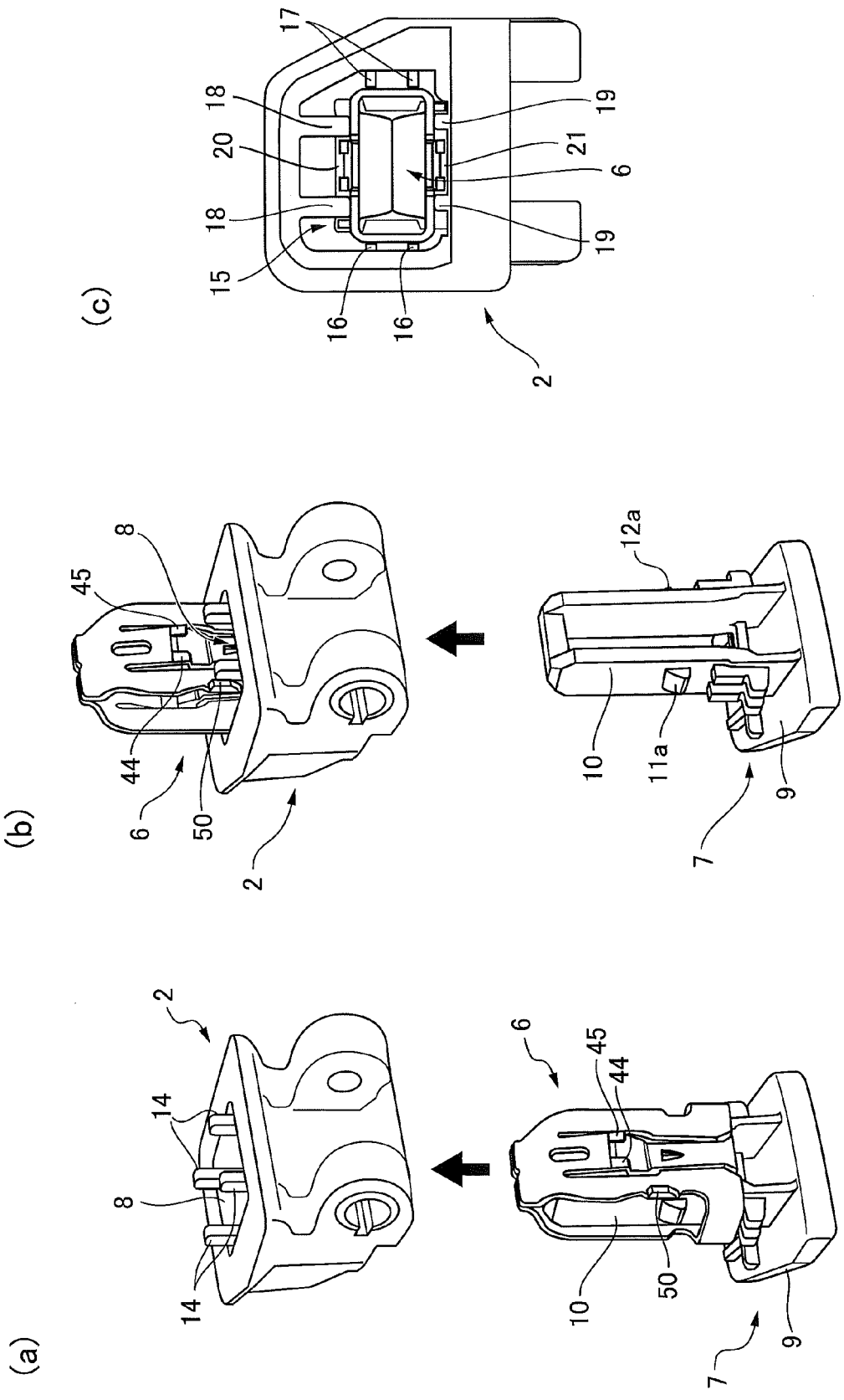
FIG. 3(a) is an explanatory view showing an example of a procedure for mounting the configurative components of the component-mounting structure of FIG. 1.
FIG. 3(b) is an explanatory view showing another example of a procedure for mounting the configurative components of the component-mounting structure of FIG. 1.
FIG. 3(c) is an explanatory view showing the clip for mounting a component as having been mounted to the base component.

Next, two procedures can be employed to assemble the three components 2, 6, and 7, as shown in FIGS. 3(a) and (b). First, in the assembly procedure shown in FIG. 3(a), the plug portion 10 of the cap 7 is first inserted into the clip 6, and the cap 7 is assembled in the clip 6. Next, these components are pressed into the component-side through-hole 8 of the base component 2, thereby resulting in the three components 2, 6, and 7 being assembled. The distal end portion of the assembled clip 6 is then pressed into the panel-side through-hole 5 of the interior panel 3, thereby resulting in the base component 2 being assembled in the interior panel 3. In the assembly procedure shown in FIG. 3(b), the clip 6 is first inserted into the component-side through-hole 8 of the base component 2, assembling the components 2 and 6. Next, the cap 7 is pressed into the component-side through-hole 8 from the rear side of the clip 6 and secured therein, thereby resulting in the three components 2, 6, and 7 being assembled. The distal end portion of the assembled clip 6 is then pressed into the panel-side through-hole 5 of the interior panel 3, thereby resulting in the base component 2 being mounted in the interior panel 3.

Pairs of clip-positioning protrusions 16, 17 that protrude inward are formed in an open edge 15 on the side opposite the interior panel 3 in the component-side through-hole 8, in the respective inner peripheral side surfaces on both sides in the width direction, as shown in FIG. 3(c). Pairs of clip-positioning protrusions 18, 19 that protrude inward are also formed respectively in the top and bottom inner peripheral ends of the open edge 15. The clip 6, positioned by these protrusions 16 to 19 in the width direction and thickness direction, is inserted into the component-side through-hole 8 of the base component 2.

When the mounted grab rail 1 is removed from the interior panel 3, first, a tool is used to pull out the cap 7. Next, the portions of the clip 6 that are in the middle of the clip width direction in the rear end edge portions (first and second cutoff pieces 40, 43 discussed hereinafter) are pressed inward in the clip thickness direction using a tool, and the engaging protuberances 44 to 47 are removed from the interior panel-side area. In this state, the clip 6 is taken out of the panel-side through-hole 5. Tool-inserting gaps 20, 21 are formed in the open edge 15 of the component-side through-hole 8, between the pair of positioning protrusions 18 and also between the pair of positioning protrusions 19. The clip 6 can easily be taken hold of by inserting the tip of the tool into these gaps, and the work of taking out the clip 6 can therefore be performed easily. When the clip 6 is taken out, the base component 2 at both ends of the grab rail 1 is removed from the interior panel 3.

(Clip)

Figure 4:
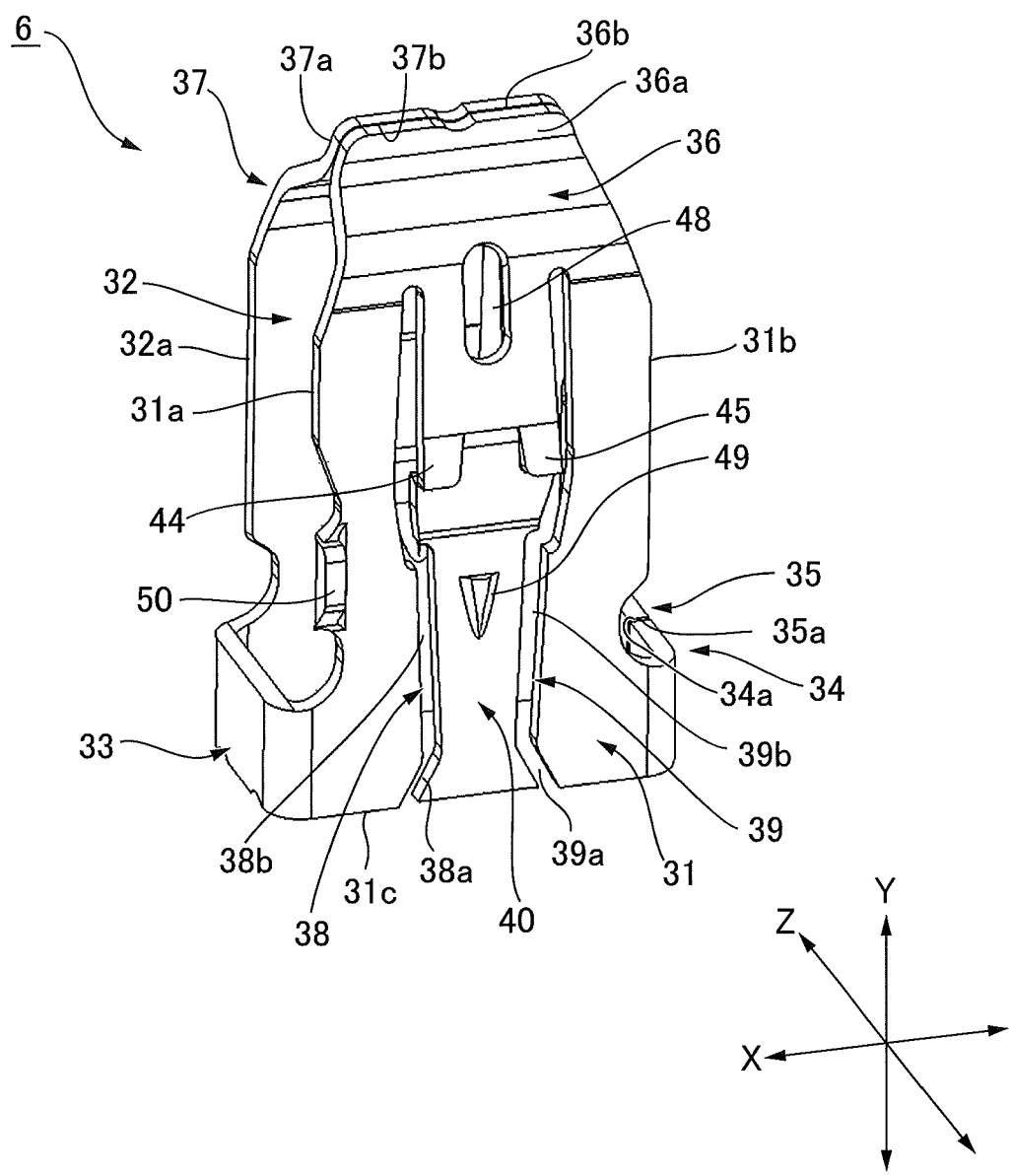
FIG. 4 is a perspective view showing the clip for mounting a component of FIG. 1.
Figure 5:
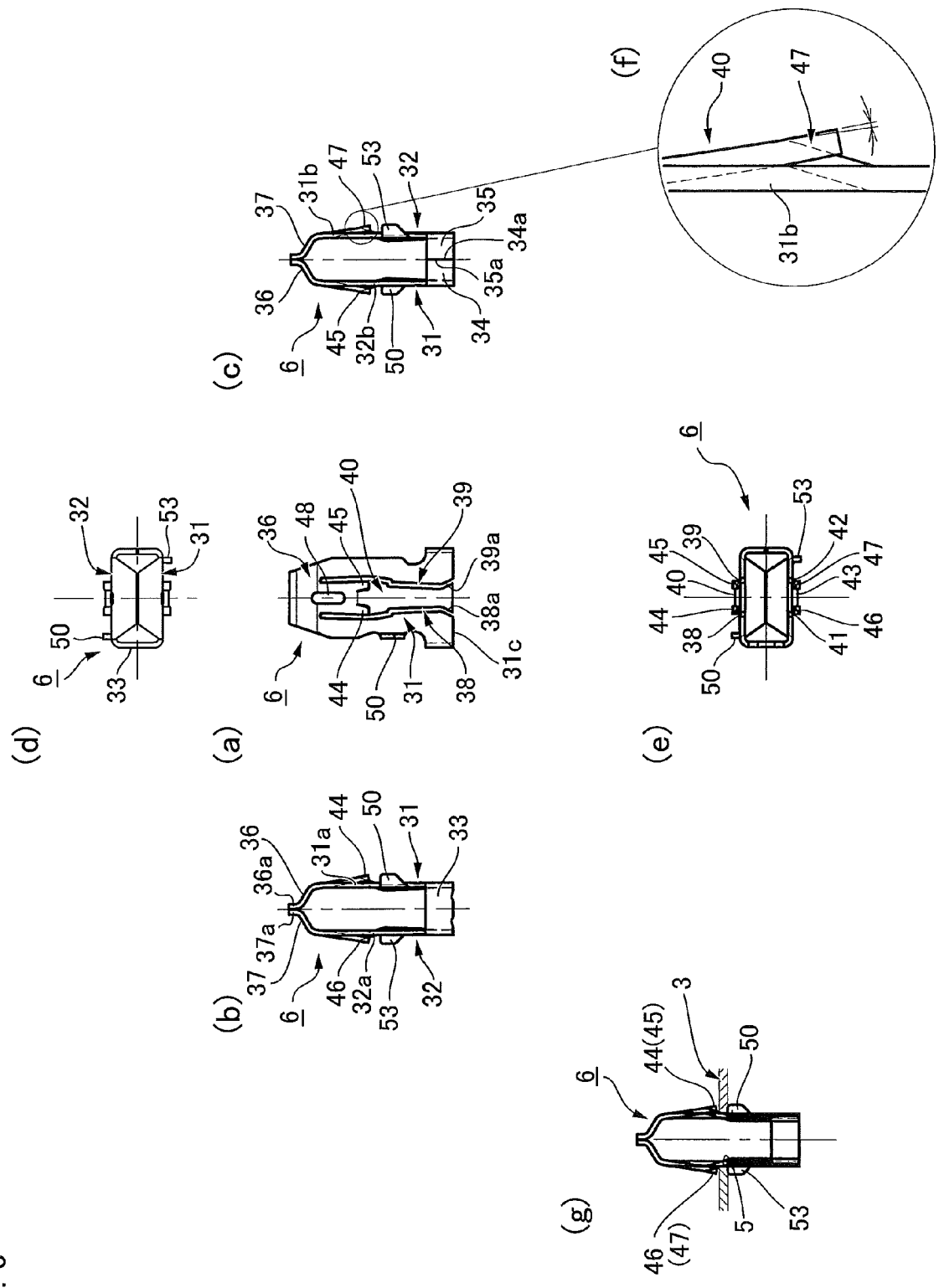
FIG. 5(a) shows a plan view of the clip for mounting a component.
FIG. 5(b) shows a left-side view.
FIG. 5(c) shows a right-side view.
FIG. 5(d) shows a front view.
FIG. 5(e) shows a rear view.
FIG. 5(f) shows a partial enlarged view showing a portion of an engaging protuberance.
FIG. 5(g) shows an explanatory view showing a state of mounting to the interior panel.
Figure 6:
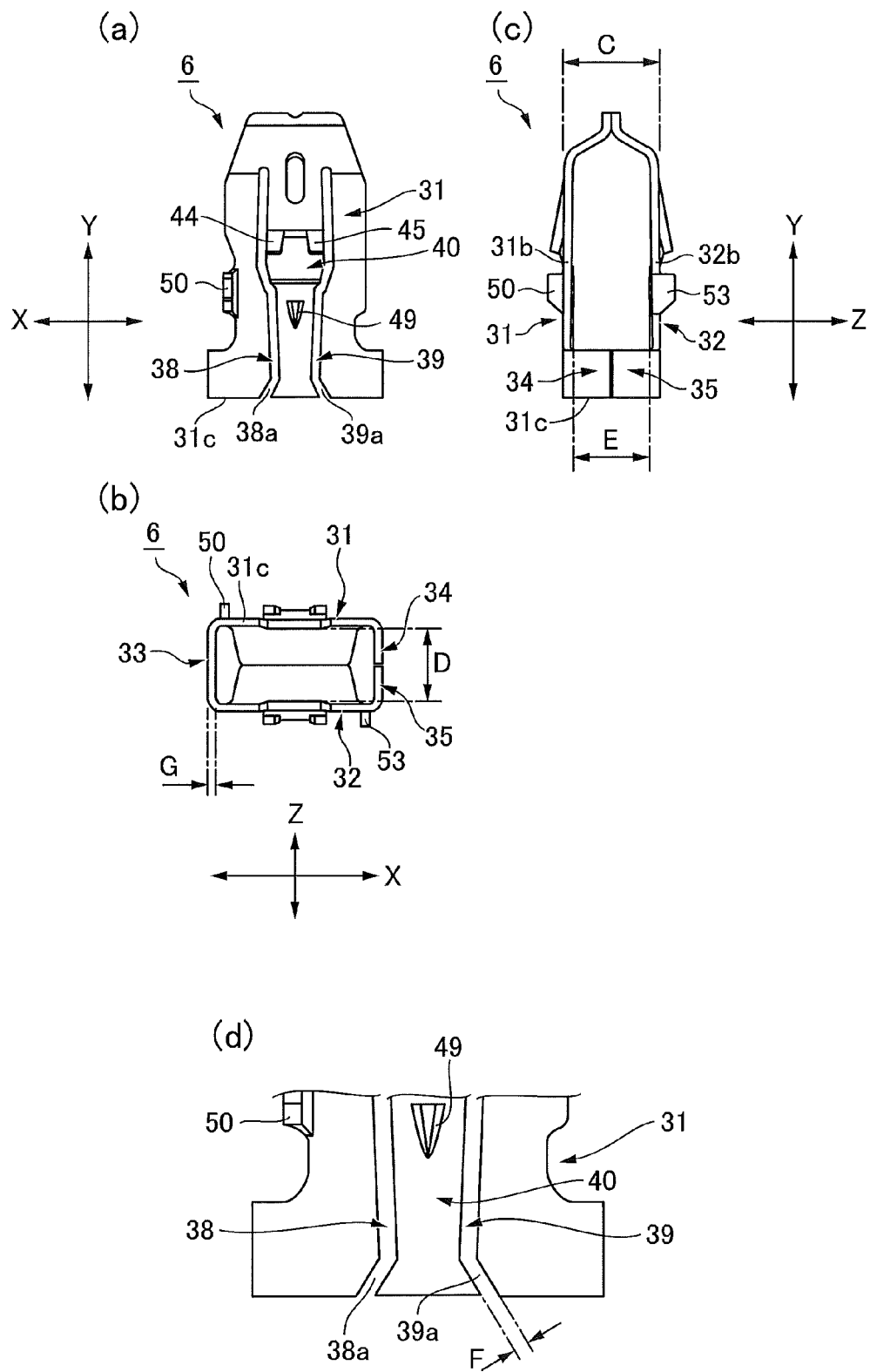
FIG. 6(a) shows a plan view.
FIG. 6(b) shows a right-side view.
FIG. 6(c) shows a rear view.
FIG. 6(d) shows a partial enlarged plan view for describing the structural characteristics of the clip for mounting a component of FIG. 1.

Next, FIG. 4 is a perspective view showing the clip 6, and FIGS. 5 (a) to 5(g) are, respectively, a plan view thereof, a left-side view, a right-side view, a front view, a rear view, a partial enlarged view showing a portion of an engaging protuberance, and an explanatory drawing showing the clip as having been mounted in the interior panel. The structure of the clip 6 is described in detail with reference to these drawings. In the following description, the clip insertion/removal direction Y is referred to as the clip longitude direction Y, and directions orthogonal thereto are referred to as the clip width direction X and the clip thickness direction Z, as shown in FIG. 4. The clip 6 is a plate metal component of constant thickness, and the clip as a whole has a bilaterally symmetric shape in both the clip width direction X and the clip thickness direction Z.

The clip 6 comprises a first plate portion 31 and a second plate portion 32 extending in the clip longitude direction Y while facing each other across a substantially fixed gap in the clip thickness direction Z. In one set of first side edges 31a, 32a of the respective first plate portion 31 and second plate portion 32 in the clip width direction X, the rear end portions in these first side edges 31a, 32a are linked to each other by a flat tabular linking side plate portion 33 having a fixed width and extending in the clip thickness direction Z.

In another set of second side edges 31b, 32b of the respective first plate portion 31 and second plate portion 32 in the clip width direction X, a first side plate portion 34 and a second side plate portion 35 of a fixed width bend in the clip thickness direction Z and extend in directions approaching each other from the respective rear end side portions in the clip longitude direction Y of these second side edges 31b, 32b. A distal end surface 34a of the first side plate portion 34 and a distal end surface 35a of the second side plate portion 35 come to be in contact midway through the clip thickness direction Z. It would also be possible for these distal end surfaces to face each other across a gap narrower than the clip plate thickness without coming in contact. The shape of the rear end side portion of the clip 6 is made rectangular (box-shaped) by the first plate portion 31, the second plate portion 32, the linking side plate portion 33, and the first and second side plate portions 34, 35.

The areas of the first plate portion 31 and the second plate portion 32 that are at the distal ends in the clip longitude direction Y are a first distal end plate portion 36 and a second distal end plate portion 37, which bend and extend forward in the clip longitude direction Y and also in directions approaching each other. In the present example, distal end edge portions 36a, 37a of the first distal end plate portion 36 and the second distal end plate portion 37 both bend and extend in the clip longitude direction Y, and surfaces 36b, 37b on the inner sides thereof are in contact with each other. It would also be possible for these surfaces to face each other across a gap narrower than the clip plate thickness without coming in contact.

Next, a pair of first slits 38, 39 are formed in the first plate portion 31, from a rear end edge 31c in the clip longitude direction Y through to the distal end edge portion. Due to the first slits 38, 39 being formed, a first cutout piece 40 that is easily elastically displaced in the clip thickness direction is formed between the first slits. Similarly, a pair of second slits 41, 42 are formed in the second plate portion 32 from the rear end edge in the clip longitude direction Y through to the distal end edge portion, and a second cutout piece 43 that is easily elastically displaced in the clip thickness direction is formed between the second slits. The first slits 38, 39 have a bilaterally symmetric shape, and comprise rear end edge slit portions 38a, 39a extending from the rear end edge 31c of the first plate portion 31, and slit main body portions 38b, 39b extending as continuations from these slit portions. The rear end edge slit portions 38a, 39a are inclined slit portions that are inclined so as to widen rearward in the clip width direction X, and the portions on the sides of the slit main body portions 38b, 39b linked thereto are straight linear slit portions extending in the clip longitude direction Y. The rear end edge slit portions 38a, 39a may be curved slit portions that extend with curvature. The other second slits 41, 42 are also formed into similar shapes, and the second slits comprise rear end edge slit portions and slit main body portions which are not shown.

In about the middle area of the first cutout piece 40 in the clip longitude direction, a pair of first engaging protuberances 44, 45 are cut and raised in the side edge portions. A pair of second engaging protuberances 46, 47 are similarly formed in the second cutout piece 43. The first engaging protuberances 44, 45 and the second engaging protuberances 46, 47 extend at an acute-angled incline so as to widen out in the clip thickness direction from the front toward the rear in the clip longitude direction Y, as can be seen in FIG. 5(f). The first engaging protuberances 44, 45 thereby protrude a predetermined amount from the surface of the rest of the first plate portion 31, and the second engaging protuberances 46, 47 protrude a predetermined amount from the surface of the rest of the second plate portion 32.

In the portion of the first cutout piece 40 that is in the center of the clip width direction X, an oval third slit 48 of a predetermined length is formed extending from the distal end edge portion of the first plate portion 31 toward the rear end edge 31c. Similarly, in the portion of the second cutout piece 43 that is in the center of the clip width direction X, an oval fourth slit (not shown) of a predetermined length is formed extending from the distal end edge portion of the second plate portion 32 toward the rear end edge. The formation of the third slit 48 and the fourth slit makes it possible for the first cutout piece 40 and the second cutout piece 43 to easily be elastically displaced in the clip thickness direction Z. When the clip 6 is taken out of the panel-side through-hole 5, the first and second cutoff pieces 40, 43 are thereby easily pressed inward, and the work of removing the first engaging protuberances 44, 45 and the second engaging protuberances 46, 47 from the interior panel 3 can be performed in a simple manner.

Furthermore, a tool-engaging convexity 49, shaped so as to bulge outward toward the clip distal end, is formed in an area of the first cutout piece 40 that is farther to the rear than the first engaging protuberances 44, 45. Though not shown, a tool-engaging convexity is similarly formed in the second cutout piece 43. This is convenient for the work of taking the clip 6 out of the panel-side through-hole 5 because the tip of the tool hooks on the tool-engaging convexity 49 of the first cutout piece 40 and the tool-engaging convexity of the second cutout piece 43, and the clip 6 can be pulled out in a simple manner.

In addition, of the first side edge 31a and the second side edge 31b of the first plate portion 31, an engaging piece 50 is cut and raised outward at a right angle in the first side edge 31a in the present example. The gap between the engaging piece 50 and the first engaging protuberances 44, 45 is set to the exactly proper dimension in the clip longitude direction Y so as to be capable of fitting the interior panel 3 therebetween. Of the first side edge 32a and second side edge 32b in the other second plate portion 32, an engaging piece 53 is similarly formed in the side of the second side edge 32b. When the clip 6 is pressed into the panel-side through-hole 5 as shown in FIG. 5(g), the engaging pieces 50, 53 come in contact with the inner peripheral edge portion of the interior panel 3 from the clip insertion direction, and the interior panel 3 comes to be fitted in between the engaging pieces 50, 53 and the engaging protuberances 44, 45, 46, and 47 engaged in the back surface of the interior panel 3.

Next, the dimensional relationships of the different parts of the clip 6 are described with reference to FIGS. 6(a) to 6(d). First, a distal end outer dimension C of the distal end portion of the clip 6 in the clip thickness direction Z is set to a dimension greater than the rear-end opening dimension and side opening dimension of the clip 6. Specifically, the distal end outer dimension C is greater than a rear end inner dimension D of the rear end edge 31c of the clip 6 in the clip thickness direction Z between the first plate portion 31 and the second plate portion 32, and is also greater than both a first side inner dimension in the clip thickness direction Z between the respective first side edges 31a, 32a of the first plate portion 31 and the second plate portion 32, and a second side inner dimension in the clip thickness direction Z between the other second side edges 31b, 32b. In the present example, the first side inner dimension and the second side inner dimension are both the same side inner dimension E. Because the dimensions are set in this manner, when clips are packaged, for example, it is possible to prevent the distal end portion of a clip 6 from entering the rear end opening or side opening of another clip and the clips from becoming entangled with each other.

The slit width F of the rear end edge slit portions 38a, 39a of the clip 6 is narrower than the clip plate thickness G. Specifically, the slit width F is narrower than the plate thickness of the first and second plate portions 31, 32, the linking side plate portion 33, the first and second side plate portions 34, 35, and other areas. It is thereby possible to reliably prevent the various areas of another clip from fitting into the rear end edge slit portions 38a, 39a of the clip 6 and the clips from becoming entangled.

(Modification of Clip 6)

Figure 7:
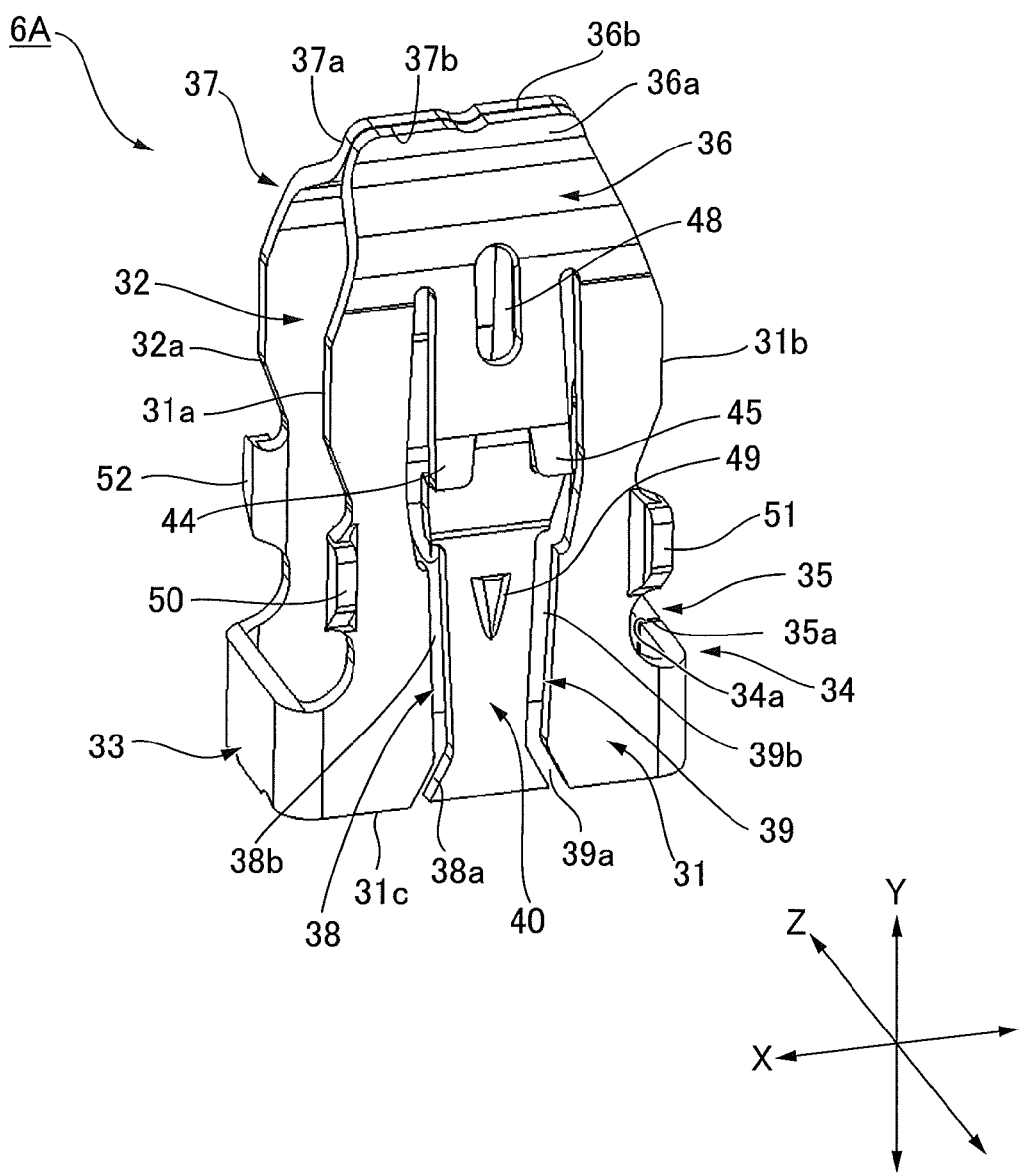
FIG. 7 is a perspective view showing a modification of the clip for mounting a component shown in FIGS. 1 to 6.

FIG. 7 is a perspective view showing a modification of the clip 6 described above. The clip 6A shown in this drawing has the same essential configuration as the clip 6, and corresponding areas are denoted by the same symbols as those of the clip 6. Points of difference are as follows. Engaging pieces 50, 51 of the same shape and size are formed respectively in the left and right first and second side edges 31a, 31b of the first plate portion 31, and engaging pieces 52, 53 of the same shape and size are formed respectively in the left and right first and second side edges 32a, 32b of the second plate portion 32 as well. The clip 6A of this configuration functions in the same manner as the clip 6, and the same operative effects are achieved.

(Other Examples of the Clip)

Figure 8:
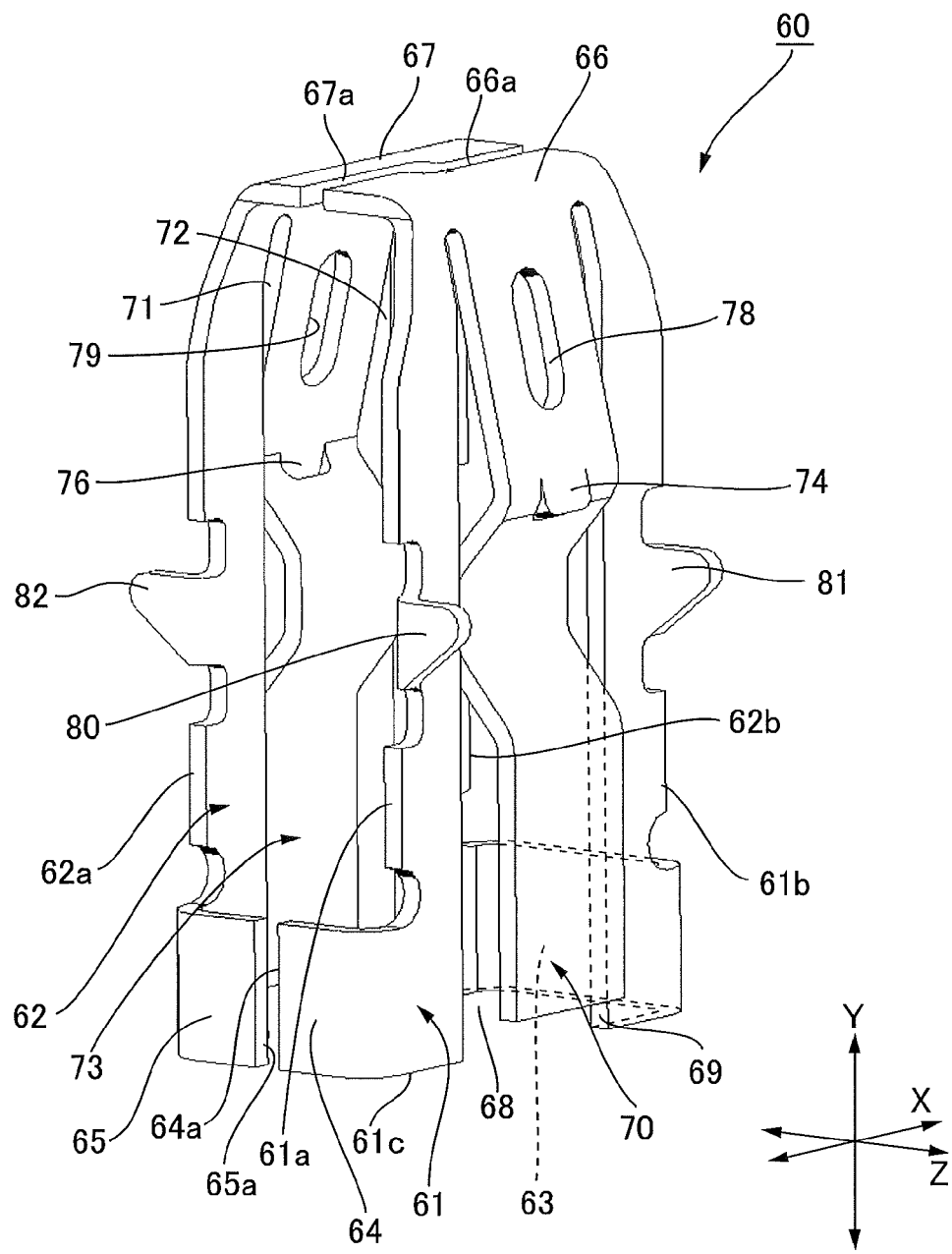
FIG. 8 is a perspective view showing another example of a clip for mounting a component to which the present invention is applied.
Figure 9:
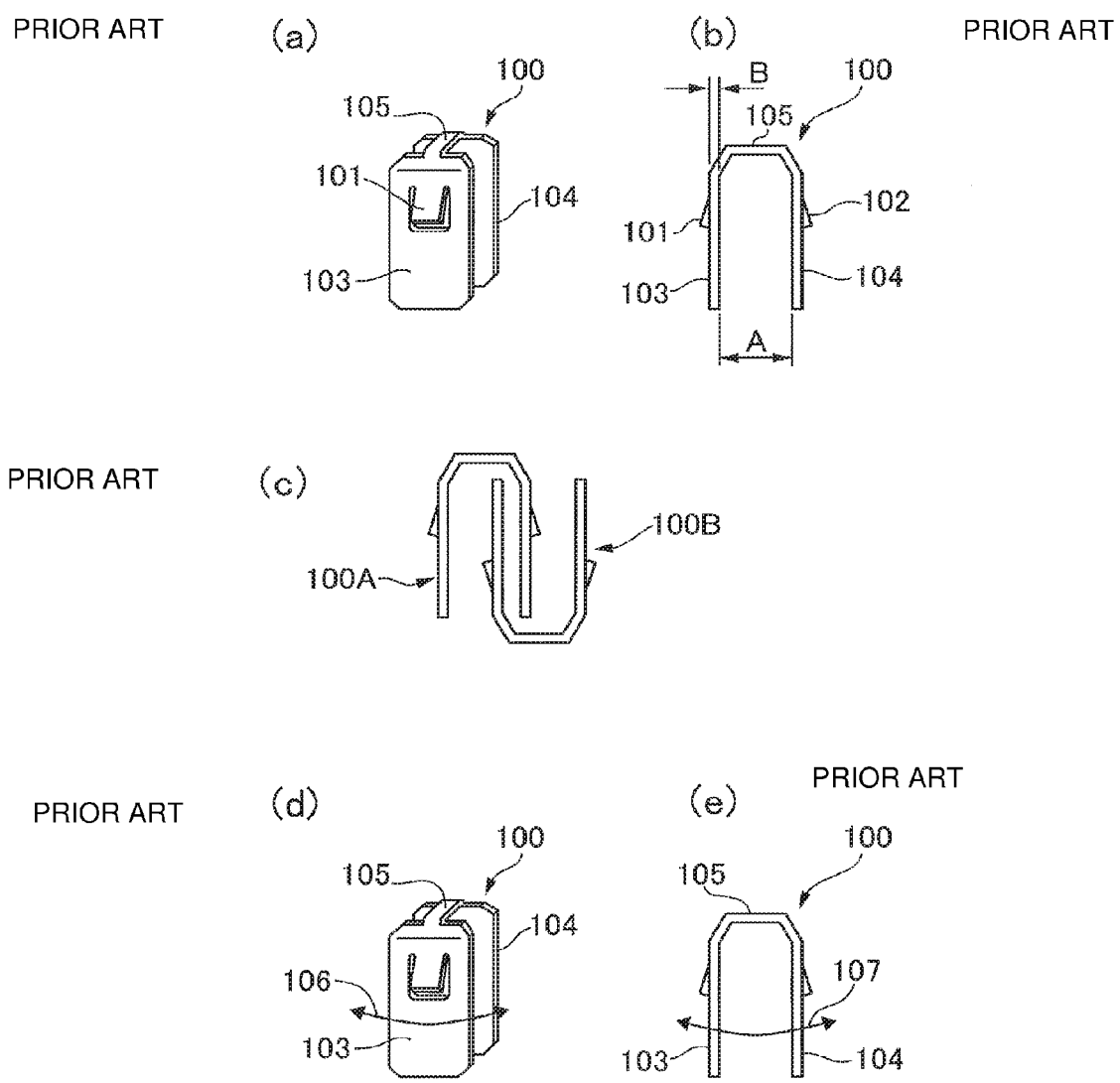
FIGS. 9(a) to 9(e) are explanatory views showing problems with a conventional plate metal clip for mounting a component.

FIG. 8 is a perspective view showing another example of a clip to which the present invention is applied, and the clip 60 shown in this drawing can be used in place of the clip 6 described above. The plate metal clip 60 has a bilaterally symmetric shape in both the clip width direction X and the clip thickness direction Z, and comprises a first plate portion 61 and a second plate portion 62 extending in the clip longitude direction Y while facing each other across a substantially fixed gap in the clip thickness direction Z. In one set of respective first side edges 61b, 62b of the first plate portion 61 and the second plate portion 62 in the clip width direction X, the rear end portions of these first side edges 61b, 62b are linked together by a flat tabular linking side plate portion 63 extending in the clip thickness direction Z at a fixed width.

In another set of second side edges 61a, 62a of the respective first plate portion 61 and second plate portion 62 in the clip width direction X, a first side plate portion 64 and a second side plate portion 65 of a fixed width bend in the clip thickness direction Z and extend in directions approaching each other from the respective rear end side portions in the clip longitude direction Y of these second side edges 61b, 62b. A distal end surface 64a of the first side plate portion 64 and a distal end surface 65a of the second side plate portion 65 face each other across a gap narrower than the clip plate thickness, midway through the clip thickness direction Z. The shape of the rear end side portion of the clip 60 is made rectangular (box-shaped) by the first plate portion 61, the second plate portion 62, the linking side plate portion 63, and the first and second side plate portions 64, 65.

The areas of the first plate portion 61 and the second plate portion 62 at the distal ends in the clip longitude direction Y are a first distal end plate portion 66 and a second distal end plate portion 67 bending in the clip thickness direction Z and extending in directions approaching each other. The distal end edge portions 66a, 67a of the first distal end plate portion 66 and second distal end plate portion 67 face each other across a gap narrower than the clip plate thickness. The gap between these surfaces is shaped with a step in a position midway through the clip width direction X.

A pair of first slits 68, 69 are formed in the first plate portion 61, from a rear end edge 61c in the clip longitude direction Y through to the distal end edge portion. Due to the first slits 68, 69 being formed, a first cutout piece 70 that is easily elastically displaced in the clip thickness direction Z is formed between the first slits. Similarly, a pair of second slits 71, 72 are formed in the second plate portion 62 from the rear end edge in the clip longitude direction Y through to the distal end edge portion, and a second cutout piece 73 that is easily elastically displaced in the clip thickness direction is formed between the second slits. The first slits 68, 69 and the second slits 71, 72 have a width that is narrower than the clip plate thickness.

In an area of the first cutout piece 70 that is midway through the clip longitude direction, a first engaging protuberance 74 is cut and raised in the middle portion thereof. A second engaging protuberance 76 is similarly formed in the second cutout piece 73 as well. The first engaging protuberance 74 and the second engaging protuberance 76 extend at an acute-angled incline so as to widen out in the clip thickness direction from the front toward the rear in the clip longitude direction Y.

In the portion of the first cutout piece 70 that is in the center of the clip width direction X, an oval third slit 78 of a predetermined length is formed extending from the distal end edge portion of the first plate portion 61 toward the rear end edge 61c. Similarly, in the portion of the second cutout piece 73 that is in the center of the clip width direction X, an oval fourth slit 79 of a predetermined length is formed extending from the distal end edge portion of the second plate portion 62 toward the rear end edge. The formation of the third slit 78 and the fourth slit 79 makes it possible for the first cutout piece 70 and the second cutout piece 73 to easily be elastically displaced in the clip thickness direction Z.

Furthermore, engaging pieces 80, 81 are cut and raised outward at right angles respectively in the left and right first side edges 61a, 61b of the first plate portion 61. The gap between the engaging pieces 80, 81 and the engaging protuberance 74 is set to the exactly proper dimension in the clip longitude direction Y so as to be capable of fitting the interior panel 3 therebetween. Engaging pieces 82, 83 (the engaging piece 83 is not shown) are similarly formed in the other second plate portion 62. When the clip 60 is pressed into the panel-side through-hole 5, the engaging pieces 80, 81, 82, and 83 come in contact with the inner peripheral edge portion of the interior panel 3 from the clip insertion direction, and the interior panel 3 comes to be fitted in between the engaging protuberances 74, 76 engaged in the back surface of the interior panel 3.

In the clip 60 of the present example, the distal end outer dimension of the distal end portion in the clip thickness direction Z is set to a dimension greater than the rear end opening dimension and the side opening dimension of the clip 60.

It is also possible for the clip 60 to be configured including only the engaging pieces 80, 83 or only the engaging pieces 81, 82.

The invention claimed is:

1. A clip for mounting a component, wherein when the clip is inserted in a clip longitudinal direction through a component through-hole formed in a component for an automobile interior to which the clip is being mounted into a panel through-hole formed in a panel where the component is mounted, a distal end portion of the clip engages in the panel and a rear portion of the clip engages the component to secure the component to the panel; the clip comprising:

a first plate portion having a rear portion and a distal portion and a second plate portion having a rear portion and a distal portion extending in the clip longitudinal direction while facing each other across a fixed gap, the clip longitudinal direction being a direction in which the clip is inserted through the component and into the panel;

a linking side plate portion for linking together rear end portions of a first side edge of each of the first plate portion and the second plate portion;

a first side plate portion and a second side plate portion bending and extending so as to approach each other from rear end portions of respective second side edges of the first plate portion and the second plate portion, the second side edges being on an opposite side of the first plate portion and the second plate portion than the first side edges in a clip width direction which is orthogonal to the clip longitudinal section;

a first distal end plate portion and a second distal end plate portion bending and extending in the clip longitudinal direction so as to approach each other from distal end edges of the first plate portion and the second plate portion, respectively;

a first engaging protuberance formed by cutting and raising part of the first plate portion in a direction away from the second plate portion in a clip thickness direction orthogonal to both the clip insertion direction and the width direction in order to engage the panel; and a second engaging protuberance formed by cutting and raising part of the second plate portion in a direction away from the first plate portion in the clip thickness direction in order to engage the panel;

a distal end of the first side plate portion and a distal end of the second side plate portion either being in contact with each other or facing each other across a gap narrower than a thickness of the first and second plate portions; and a distal end of the first distal end plate portion and a distal end of the second distal end plate portion either being in contact with each other or facing each other across a gap narrower than the thickness of the first and second plate portions;

wherein the clip is made of a metal plate.

2. The clip for mounting a component according to claim 1, wherein a distal end outer dimension in the clip thickness direction in distal ends of the first plate portion and the second plate portion in the clip longitude direction is greater than a rear end inner dimension in the clip thickness direction in rear end edges of the first plate portion and the second plate portion in the clip longitude direction, and the distal end outer dimension is greater than both a first side inner dimension in the clip thickness direction between the first side edges of the first plate portion and the second plate portion, and a second side inner dimension in the clip thickness direction between the second side edges of the first plate portion and the second plate portion.

3. The clip for mounting a component according to claim 1, wherein a pair of first slits are formed in the first plate portion toward the distal end at a predetermined gap from a rear end edge in the clip longitudinal direction, and a first cutout piece comprising the first engaging protuberance is formed between the pair of first slits in the first plate portion, a pair of second slits are formed in the second plate portion toward the distal end at a predetermined gap from a rear end edge in the clip longitudinal direction, and a second cutout piece comprising the second engaging protuberance is formed between the pair of second slits in the second plate portion, the pair of the first slits and the pair of the second slits respectively have a rear end edge slit portion extending from the rear end edge and a slit main body portion continued and extending from the rear end edge slit portion, and the rear end edge slit portions are made into either inclined slit portions extending in a direction inclined relative to the slit main body portion, or curved slit portions that extend in a curve.

4. The clip for mounting a component according to claim 3, wherein the rear end edge slit portions have a slit width narrower than the clip plate thickness.

5. The clip for mounting a component according to claim 3, wherein
a tool engaging convexity is formed on outside surfaces in the clip thickness direction in the respective first cutout piece and the second cutout piece, the tool engaging convexity being poisoned at a rear side in the clip longitude direction with respect to the first engaging protuberance and the second engaging protuberance.

6. The clip for mounting a component according to claim 3, wherein
the first cutout piece is formed with a pair of the first engaging protuberances at a fixed gap in the clip width direction, and
the second cutout piece is formed with a pair of the second engaging protuberances at a fixed gap in the clip width direction.

7. The clip for mounting a component according to claim 3, wherein
a third slit having a predetermined length is formed on a center part in the clip width direction in the first cutout piece, the third slit extending toward the rear end edge from the distal end edge of the first plate portion, and
a fourth slit having a predetermined length is formed on a center part in the clip width direction in the second cutout piece, the fourth slit extending toward the rear end edge from the distal end edge of the second plate portion.

8. A component-mounting structure for mounting an interior component to an automobile interior panel, the component-mounting structure comprising:
a component through-hole formed in the interior component; the clip according to claim 1 for inserting into the component through-hole from a predetermined clip insertion direction; and a cap for attaching to and closing up the component through-hole, wherein
a clip distal-end side portion at a distal end side in the clip insertion direction in the clip passes through the component through-hole and is inserted into a panel through-hole formed in the interior panel,
the clip distal-end side portion is formed with the first engaging protuberance for engaging in the interior panel from a clip removal direction that is the opposite direction of the clip insertion direction,
the clip is formed with an engaging piece on a side of the clip removal direction with respect to the first engaging protuberance,
the cap has a cap main body portion for engaging in and closing up the component through-hole from the clip insertion direction, a plug portion protruded from the cap main body portion and for inserting into the clip,
the plug portion of the cap is formed with an engaging part for engaging in the interior component from the clip removal direction so as to prevent the cap from falling out of the component through-hole, and
a state is formed in which the interior panel is sandwiched between the first engaging protuberance and the engaging piece of the clip.

* * * * *